(12) United States Patent
Belau

(10) Patent No.: US 6,534,882 B2
(45) Date of Patent: Mar. 18, 2003

(54) CONFIGURATION FOR TRIGGERING A RESTRAINT DEVICE IN A MOTOR VEHICLE

(75) Inventor: Horst Belau, Langquaid (DE)

(73) Assignee: Siemens Aktiengesellschaft, Munich (DE)

( * ) Notice: Subject to any disclaimer, the term of this patent is extended or adjusted under 35 U.S.C. 154(b) by 175 days.

(21) Appl. No.: 09/781,206

(22) Filed: Feb. 12, 2001

(65) Prior Publication Data

US 2001/0020801 A1 Sep. 13, 2001

(30) Foreign Application Priority Data

Feb. 10, 2000 (DE) .......................................... 100 05 785

(51) Int. Cl.⁷ ................................................. B60L 1/00
(52) U.S. Cl. ...................................... 307/10.1; 307/9.1
(58) Field of Search ................................. 307/9.1, 10.1

(56) References Cited

U.S. PATENT DOCUMENTS 5,668,723 A    9/1997  Blackburn ................... 701/45

FOREIGN PATENT DOCUMENTS

DE    19622685 A1    9/1997
DE    19731717 C1    12/1998

*Primary Examiner*—Brian Sircus
*Assistant Examiner*—Robert L. DeBeradinis
(74) *Attorney, Agent, or Firm*—Laurence A. Greenberg; Werner H. Stemer; Gregory L. Maybeck

(57) ABSTRACT

A configuration containing a sensor for accident detection, a downstream control device, a downstream firing device and a firing element for a restraint device is described. The control device generates a control signal that is composed of a first current in one direction and a subsequent second current in the opposite direction. The firing device has an integration device for integrating the first current, and also an enable device, which is connected downstream of the integration device and serves for enabling firing of the firing element. The firing of the firing element is effected by the second current when or after a limit value of the integral of the first current has been reached.

9 Claims, 1 Drawing Sheet

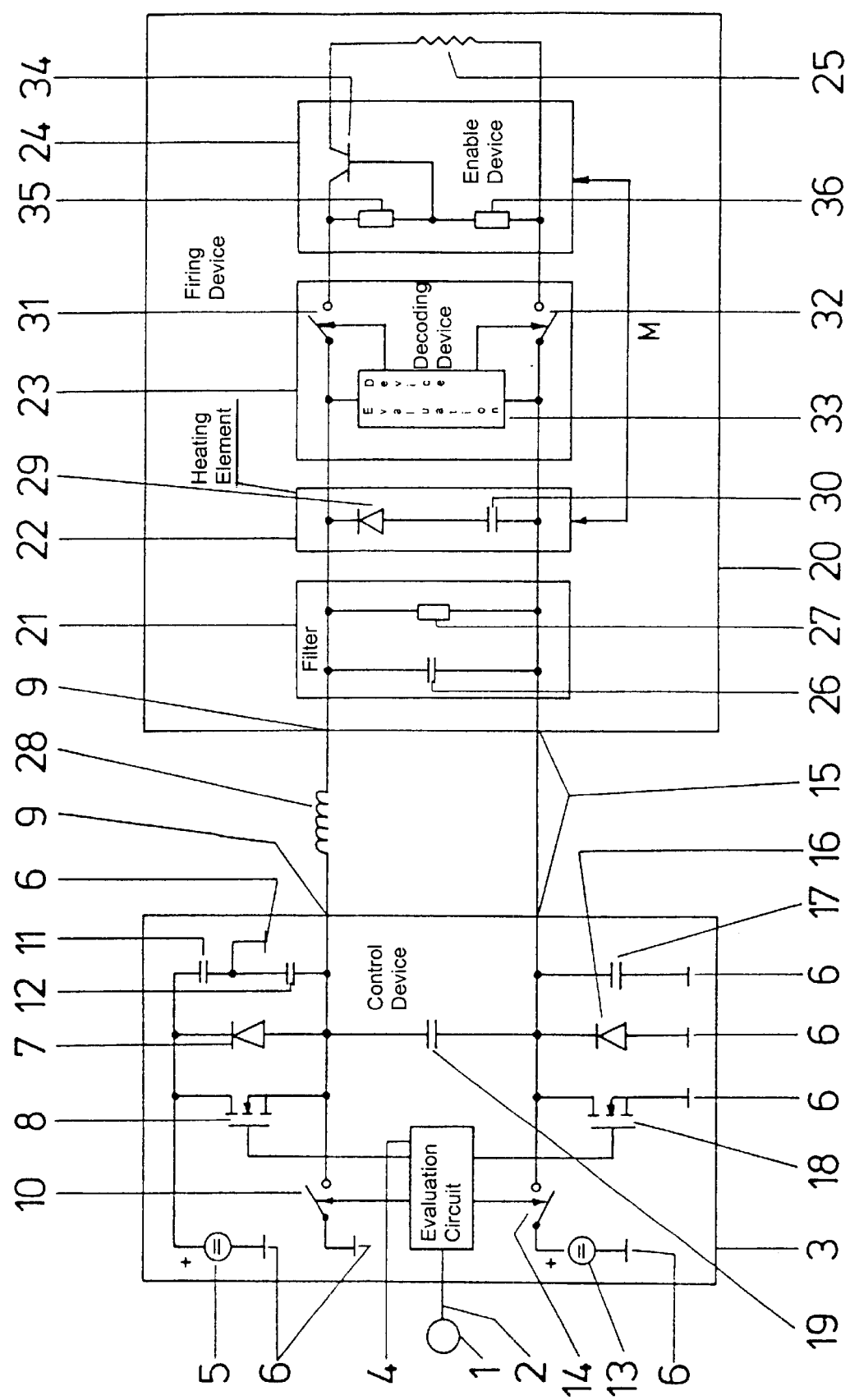

CONFIGURATION FOR TRIGGERING A RESTRAINT DEVICE IN A MOTOR VEHICLE

BACKGROUND OF THE INVENTION

Field of the Invention

The invention relates to a configuration for triggering a restraint device in a motor vehicle having a sensor for accident detection. The sensor outputs an impact signal in the event of an impact of the vehicle. A control device, which is connected downstream of the sensor, generates a control signal in response to the impact signal supplied by the sensor. The configuration further has a firing device, which is disposed spatially separately from the control device and is connected to the latter via a line, and a firing element for the restraint device, which is electrically coupled to the firing device.

A configuration of this type has a DC signal for operating the firing device and the DC signal is coupled onto a line and an AC signal containing messages for firing triggering is additively superposed on the DC signal. The composite signal is then transmitted from an evaluation device to the firing device and appropriately evaluated there. Although the problem of undesired firing caused by interference pulses which arises in the case of direct-current firing is counteracted in this known configuration, the requisite outlay is very high.

SUMMARY OF THE INVENTION

It is accordingly an object of the invention to provide a configuration for triggering a restraint device in a motor vehicle which overcomes the above-mentioned disadvantages of the prior art methods of this general type, in which interference immunity is achieved with a lower outlay.

With the foregoing and other objects in view there is provided, in accordance with the invention, a configuration for triggering a restraint device in a motor vehicle. The configuration contains a sensor for accident detection, the sensor outputting an impact signal in an event of an impact on the vehicle. A control device is connected downstream of the sensor and generates a control signal in response to the impact signal supplied by the sensor. The control signal is composed of a first current in a first direction and a subsequent second current in second direction opposite the first direction. A firing element for firing the restraint device and a firing device disposed spatially separate from the control device and is connected to the control device through the line and also is electrically coupled to the firing element. The firing device has an integration device for integrating the first current and an enable device connected downstream of the integration device and serving for enabling firing of the firing element. The firing of the firing element is effected by the second current when a limit value of an integral of the first current has been reached.

It is an advantage of the invention that the required logic complexity for remote-controlled firing (remote firing system) can be considerably reduced, thereby reducing costs and space requirement. In particular, there is no need for any components in the wiring harness, so that all components can be integrated in the firing pellet (e.g. semiconductor firing pellet).

This is achieved in particular by the fact that the configuration is provided which permits firing only after an activation phase (preferably heating phase). In this case, the current flow for activation is opposite to the current direction in the case of firing.

In detail, the configuration according to the invention contains, in particular, the sensor for accident detection, which generates the impact signal, and the control device, which is connected downstream of the sensor and generates the control signal in response to the impact signal supplied by the sensor. The firing device is disposed spatially separate from the control device and is connected to the latter via a line, the firing element for the restraint device is electrically coupled to the firing device. The control signal generated by the control device is composed, according to the invention, of a first current in one direction and a subsequent second current in the opposite direction. The firing device contains the integration device for integrating the first current, and also the enable device, which is connected downstream of the integration device and serves for enabling firing of the firing element. The firing of the firing element is effected by the second current when or after a limit value of the integral of the first current has been reached.

The integration is preferably effected thermally by a heating element and a mass thermally coupled thereto. In this case, the enable device has a temperature-sensitive switch, which is thermally coupled to the mass and switches through to the firing element when a limit value temperature of the mass has been reached. The "thermal integration" has the advantage that it requires little outlay, on the one hand, and affords a high interference immunity, on the other hand.

The temperature-sensitive switch provided may be a transistor, whose controlled path is connected in series with the firing element and whose control terminal is coupled to the control signal generated by the control device, in such a way that the transistor always turns off in the case of the first current and turns on in the case of the second current only when the temperature at the transistor is greater than or equal to the limit value temperature. In this case, the temperature dependence of transistors can advantageously be utilized in order, in conjunction with a low outlay and space requirement, to realize a temperature-dependent switch which, moreover, can also distinguish current directions given appropriate circuitry.

By way of example, the transistor provided is a bipolar transistor or a MOS field-effect transistor, whose base/gate is connected to a tap of a voltage divider fed with the control signal, whose emitter/source is connected to one terminal of the firing element, and whose collector/drain is connected to one terminal of the voltage divider, the other terminal of the voltage divider being connected up to the other terminal of the firing element. Bipolar transistors are very simple to produce and are distinguished by high robustness with respect to external influences (for example momentary electrostatic discharges of high voltage). MOS field-effect transistors advantageously require only a small driving current and, therefore, no costly driver circuits for driving.

In order to save space and reduce additional outlay, the mass may in this case be formed from the temperature-sensitive switch (for example semiconductor body of the transistor) and/or the heating element (for example semiconductor body of a diode serving as the heating element).

The heating element is preferably configured in such a way that although the heating element can be heated by the first current, it cannot be heated by the second current, and that the first current is pulsed, with the heating element only being able to be heated by alternating currents. This increases the interference immunity of the entire configuration.

Contributions to further increasing the interference immunity are made, moreover, by the measures that a low-pass filter is connected between the control device and the firing device, and/or that the first and/or second current are coded, there being connected upstream of the temperature-sensitive switch a decoding device for additional firing enabling.

Other features which are considered as characteristic for the invention are set forth in the appended claims.

Although the invention is illustrated and described herein as embodied in a configuration for triggering a restraint device in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single figure of the drawing is a circuit diagram of a configuration of triggering a restraint device in a motor vehicle according to the invention.

DESCRIPTION OF THE PREFERRED EMBODIMENT

Referring now to the single figure of the drawing in detail, there is shown a configuration for triggering a restraint device in a motor vehicle. In the event of an impact of the vehicle, an impact signal 2 is transmitted to a control device 3 from an impact sensor 1 for accident detection, the sensor 1 being situated in a non-illustrated vehicle. The control device 3 contains an evaluation circuit 4, which, having received the impact signal 2, controls the sequences in the control device 3 in a corresponding manner. The control device 3 additionally has a voltage source 5, which is connected to a reference-ground point 6 by its negative pole in the exemplary embodiment shown. A positive pole of the voltage source 5 is connected to a cathode terminal of a diode 7 and also to a drain terminal of an N-channel enhancement-mode MOS field-effect transistor 8. An anode terminal of the diode 7 and a source terminal of the MOS field-effect transistor 8 are connected up to a line 9. The line 9 can furthermore be connected to the reference-ground point 6 via a controllable switch 10 (for example likewise a transistor). A control terminal of the switch 10 and a gate terminal of the MOS field-effect transistor 8 are connected to the evaluation circuit 4 and are controlled by the latter. Connected in parallel with the diode 7 is a capacitive voltage divider having two capacitors 11 and 12, whose tap is connected to the reference-ground point 6 and which serves for suppressing interference spikes during the switching of the switch 10 and/or of the MOS field-effect transistor 8.

The control device 3 furthermore contains a voltage source 13, whose negative pole is connected to the reference-ground point 6 and whose positive pole can be connected to a line 15 by a controllable switch 14. Connected between the line 15 and reference-ground point 6 are a reverse-biased diode 16, in parallel therewith a capacitor 17 and likewise in parallel therewith the drain-source path of an N-channel enhancement-mode MOS field-effect transistor 18. In this case, the MOS field-effect transistor 18 is connected to the reference-ground point 6 by its source terminal and to the line 15 by its drain terminal. Just like the control terminal of the controllable switch 14, the gate terminal of the MOS field-effect transistor 18 is connected to the evaluation circuit 4 and is controlled by the latter. Finally, a capacitor 19 for voltage smoothing is connected between the lines 9 and 15.

Having received the impact signal 2, the control device 3 first generates, for a specific period of time, a negative (DC) current, i.e. a potential on line 9 is more negative than that on line 15. To that end, in the control device 3 the switches 10 and 14 are turned on (the MOS field-effect transistors 8 and 18 turn off), to be precise, in a development of the invention, in such a way that the switches 10 and 14 are continually switched on and off synchronously during this phase (activation phase). A pulsed direct-current signal is thus produced on the lines 9 and 15. In the subsequent phase (firing phase), a positive (DC) current is then passed onto the lines 9 and 15, i.e. the potential on line 9 is more positive than that on line 15. To that end, the MOS field-effect transistors 8 and 18 are turned on, while the switches 10 and 14 are open. In this case, in a development of the invention, the MOS field-effect transistors 8 and 18 are turned on in such a way that they are continually switched on and off during this phase, to be precise with a specific clock frequency and/or a specific switch-on and-off sequence.

The lines 9 and 15 are led to a firing device 20 containing, for example, a filter 21, a heating element 22 connected downstream thereof, a downstream decoding device 23 and, finally, a downstream enable device 24 for driving a firing element 25. In this case, the heating element 22 and the enable device 24 are thermally coupled to one another and together form a common mass M that is heated by the heating element 22. In addition, the heating element 22 has an integrator. The firing device 20 includes a firing element 25 and is preferably an integrated circuit and accommodated in a single housing.

In the exemplary embodiment, the filter 21 contains a parallel circuit formed by a capacitor 26 and a resistor 27, which are both connected between the lines 9 and 15. Furthermore, the filter 21 can be assigned an inductor 28, whose size, however, results in that it is not situated in the circuit, and which is connected into the line 9 between the control device 3 and the firing device 20. Given an appropriate configuration, however, the inductance of the lines 9 and 15 may also be used as an alternative to the inductor 28.

In the exemplary embodiment, the heating element 22 contains a diode 29 of appropriate polarity, which diode 29 is connected between the lines 9 and 15 via a capacitor 30 connected in series with the diode 29. In this case, the polarity of the diode 29 is such that only a negative current can flow through the diode 29 and heat the latter. Consequently, in the exemplary embodiment, the anode of the diode 29 is coupled to line 15 and the cathode to line 9. The capacitor 30 serves to block DC components and thus allow only alternating currents or pulsed direct currents to pass. Since the control device 3 supplies a pulsed negative current during the first phase (activation phase), the diode 29 and thus the heating element 22 are consequently heated in this phase.

As a further security measure, the heating element 22 is followed by the decoding device 23 having, by way of example, two controllable switches 31 and 32 connected into the lines 9 and 15. The two switches 31 and 32 are driven by an evaluation circuit 33, which is fed and controlled via the lines 9 and 15, in such a way that the switches 31 and 32 are turned on only in the case of a specific clock frequency and/or switching sequence (coding) of the pulsed positive current in the second phase (firing phase).

Finally, the decoding device 23 is followed by the enable device 24 for the firing element 25. The enable device 24 contains a bipolar transistor 34 of the NPN type, whose collector terminal is connected to the line 9 and whose emitter terminal is connected, with the interposition of the firing element 25, to the line 15. A resistive voltage divider having two resistors 35 and 36 is connected between the lines 9 and 15, a base terminal of the bipolar transistor 34 being connected (if appropriate with the interposition of a driver) to the tap of the voltage divider. Only above a specific temperature at the bipolar transistor 34 does the latter switch on in the case of a specific (positive) voltage at the base terminal. The turn-on of the bipolar transistor 34 can thus be set by way of the temperature (depending essentially on supplied energy, mass and time) and the positive voltage applied to the base terminal, in such a way that after a specific activation phase with negative current, firing can be effected in the subsequent phase exclusively by a positive current, if the temperature at the bipolar transistor 34 has been set sufficiently high by the heating element 22. However, as an alternative or in addition, the distinction between negative and positive current may also be made in the decoding device 23. Moreover, the decoding device 23 may alternatively intervene directly in the control circuit (base) of the bipolar transistor 34 rather than, as shown, in the circuit of the bipolar transistor 34, as a result of which the two switches 31 and 32 can be omitted.

The configuration according to the invention shown as an exemplary embodiment thus has a device that enables firing only after activation (heating). In this case, the current direction during heating is opposed to the current direction in the case of firing. The current flow through the heating element is possible only in a pulsed manner. Consequently, a direct current cannot effect the necessary heating, thereby preventing undesired triggering as a result of direct current occurring erroneously on the lines. In order to increase the security further, the firing current path is interrupted by the decoding device. These measures make it possible, on the one hand, to simplify the required logic in a remote firing system (RFS) and, on the other hand, to increase the security, with the result that, particularly with an integrated circuit realization, costs can be saved and the dimensions can be reduced. There is no need for any further components in the wiring harness. All components can be integrated in a firing pellet (e.g. semiconductor firing pellet).

In accordance with one development of the invention, the temperature dependence of semiconductors is utilized. The bipolar transistor 34 (PN junction) for activating the firing device 25 requires a much greater switch-on voltage at high temperatures than e.g. at room temperature. The switch-on voltage is chosen to be so high, then, that the bipolar transistor 34 cannot turn on until, for example, approximately 150° C. A further element in the firing device provides for the heating of the enable device. The heating element is supplied by applying a voltage specifically provided for this purpose. However, the signal for heating is the inverse of the actual firing signal and the voltage level which can be reached at this element also does not exceed the required level for firing when applied. In this case, the heating element and the firing stage are thermally coupled, but the other elements, such as in particular the firing element, are not. Furthermore, the configuration is improved still further by the firing being effected only after an additional (noncomplicated) decoding of the signals.

I claim:

1. A configuration for triggering a restraint device in a motor vehicle, comprising:
    a sensor for accident detection, said sensor outputting an impact signal in an event of an impact on the vehicle;
    a control device connected downstream of said sensor and generating a control signal in response to the impact signal supplied by said sensor, the control signal composed of a first current in a first direction and a subsequent second current in second direction opposite the first direction;
    a line;
    a firing element for firing the restraint device; and
    a firing device disposed spatially separate from said control device and connected to said control device through said line and also electrically coupled to said firing element, said firing device having an integration device for integrating the first current and an enable device connected downstream of said integration device and serving for enabling firing of said firing element, the firing of said firing element being effected by the second current when a limit value of an integral of the first current has been reached.

2. The configuration according to claim 1, wherein said firing device has a heating element and a mass thermally coupled to said heating element such that integration is effected thermally by said heating element, said enable device has a temperature-sensitive switch thermally coupled to said mass and switches through to said firing element when a limit value temperature of said mass has been reached.

3. The configuration according to claim 2, wherein said temperature-sensitive switch is a transistor having a controlled path connected in series with said firing element, said transistor further having a control terminal coupled to said control device and receiving the control signal generated by said control device in such a way that said transistor always turns off in a case of the first current and turns on in the case of the second current only when a temperature of said transistor is greater than or equal to the limit value temperature.

4. The configuration according to claim 3, wherein:
    said enable device has a voltage divider with a tap and terminals, said voltage divider connected to said control device and receiving the control signal;
    said firing element having a first terminal and a second terminal; and
    said transistor has a base/gate terminal connected to said tap of said voltage divider receiving the control signal, an emitter/source terminal connected to said first terminal of said firing element, and a collector/drain terminal connected to one of said terminals of the voltage divider, and another of said terminals of said voltage divider connected to said second terminal of said firing element.

5. The configuration according to claim 2, wherein said mass is formed of at least one of said temperature-sensitive switch and said heating element.

6. The configuration according to claim 2, wherein said heating element can be heated by the first current, and said heating element cannot be heated by the second current.

7. The configuration according to claim 2, wherein the first current is pulsed, and said heating element can only be heated by alternating currents.

8. The configuration according to claim 2, wherein said firing device has a low-pass filter connected between said control device and said heating element.

9. The configuration according to claim 2, wherein at least one of the first current and the second current is coded, and said firing device has a decoding logic unit connected upstream of said temperature-sensitive switch for additional firing enabling.

* * * * *